United States Patent Office 2,778,844
Patented Jan. 22, 1957

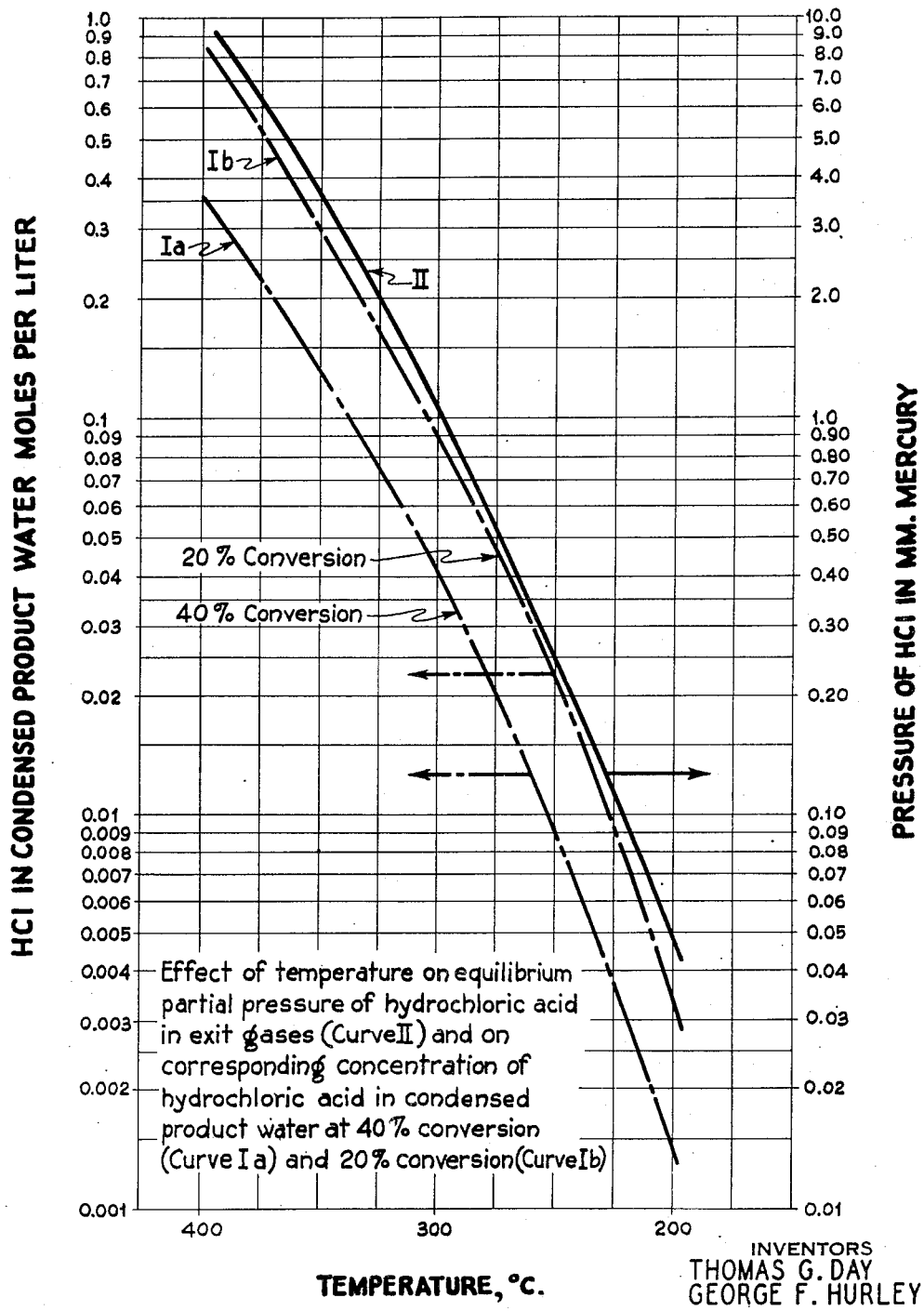

2,778,844
HALOGEN INHIBITED SYNTHESIS OF HYDROCARBONS

Thomas G. Day, South Charleston, and George F. Hurley, St. Albans, W. Va., assignors to Union Carbide and Carbon Corporation, a corporation of New York Application January 4, 1952, Serial No. 264,926

3 Claims. (Cl. 260—449.6)

This invention relates to an improvement in the synthesis of hydrocarbons from carbon monoxide and hydrogen in the presence of iron catalysts.

According to application Serial No. 136,813, now Patent No. 2,717,259, filed January 4, 1950, by H. G. Davis and T. P. Wilson, and assigned to the same assignee as the present application, the formation of gaseous olefins as well as water in the iron catalyzed synthesis of hydrocarbons from carbon monoxide and hydrogen is increased by controlled inhibition whereby the catalyst is subjected during synthesis to regulated amounts of the halogens, chlorine, bromine or iodine, or compounds containing these halogens. After a brief period of operation under these conditions, a deposit of ferrous halide exists on the catalyst and hydrogen halides are found in the exit gases. The formation of hydrogen halides in the exit gases can be accounted for by an equilibrium which exists between the ferrous halide on the catalyst and the hydrogen present in the synthesis gas, as follows, where X is Br, Cl or I:

$$FeX_2 + H_2 \rightleftharpoons Fe + 2HX$$

Because an equilibrium of this nature exists, the effects of inhibition are maintained by continuously or intermittently introducing halogen to the catalyst, to compensate for that removed as hydrogen halide in the exit gases. As a result, the present process requires the purchase of a halogen inhibitor as an added expense of operation. In addition, since water rather than carbon dioxide is the principal by-product of the inhibited synthesis reaction ($2H_2 + CO \rightarrow (CH_2) + H_2O$), an aqueous solution of a hydrogen halide is obtained when the reaction products are condensed and the hydrocarbon separated. Such solutions, particularly of hydrogen chloride, are corrosive and special alloys are required to handle them.

Accordingly, the object of this invention is to conduct the above described inhibited synthesis of hydrocarbons in such a manner that it will be practically self-sustaining in its inhibitor requirements and that only very weak, relatively non-corrosive solutions of hydrogen halides will be obtained as by-products.

This object is accomplished by utilizing the effect of temperature on the equilibrium between a ferrous halide and hydrogen. For the various halogens, the equilibrium and equilibrium constants are given by the relations:

1. $$FeCl_2 + H_2 \rightleftharpoons Fe + 2HCl$$

$$K = \text{equilibrium const.} = \frac{(p_{HCl})^2}{p_{H_2}}$$

$$Log_{10} K = -\left(\frac{7623}{T(°K.)}\right) + 6.76$$

2. $$FeBr_2 + H_2 \rightleftharpoons Fe + 2HBr$$

$$K = \frac{(p_{HBr})^2}{p_{H_2}}$$

$$Log_{10} K = -\left(\frac{8390}{T(°K.)}\right) + 6.66$$

3. $$FeI_2 + H_2 \rightleftharpoons Fe + 2HI$$

$$K = \frac{(p_{HI})^2}{p_{H_2}}$$

$$Log_{10} K = -\left(\frac{8070}{T(°K.)}\right) + 6.66$$

Definitions:

$T(°K.)$ = absolute temperature
$p_{HX}$ = partial pressure of HX, atm. abs.
$p_{H_2}$ = partial pressure of $H_2$, atm. abs.

For a given partial pressure of hydrogen and at equilibrium, it is seen from the typical Equation 1 above that the value of K increases with the temperature since, for instance, the negative expression $$-\left(\frac{7623}{T(°K.)}\right)$$

becomes smaller as the temperature increases. Since $p_{HCl} = \sqrt{K \cdot p_{H_2}}$, it is apparent that the partial pressure of hydrogen chloride, for a given partial pressure of hydrogen, will increase with the value of K, and correspondingly therefore the amount of hydrogen chloride in equilibrium will vary directly with the temperature of the iron catalyst bed.

Thus, the object of this invention is accomplished by passing the exit gases from the synthesis converter which contains a substantial amount of hydrogen halide at synthesis temperatures, for example, of 300° to 400° C. over a second bed of iron particles or iron-containing substances such as the iron base catalyst, iron oxide and iron oxide ores, at a substantially lower temperature than that of the iron catalyst in the converter. At the lower temperature, the hydrogen halide will react with the iron in the second bed, which may be termed a stripper, to form an iron halide until, under ideal conditions, the amount of hydrogen chloride in the exit gases will decline to the equilibrium value for the temperature of the stripper. The change in the concentration of hydrogen chloride in the exit gases obtainable by this means is extremely large. In the drawing, curve II, for a partial pressure of hydrogen of 7.4 atm. abs., it is shown how the partial pressure of hydrogen chloride in equilibrium with ferrous chloride varies with the temperature. Thus, at 360° C., the equilibrium partial pressure of hydrogen chloride is 4.55 mm. of mercury, while at 200° C. it is 0.048 mm. of mercury. This means that, under ideal conditions, the stripper at 200° C. removes 99% of the hydrogen chloride formed in the converter at 360° C.

One practical result of this removal of hydrogen chloride is shown in the curves Ia and Ib of the drawing, which give the concentrations of hydrogen chloride in the product water corresponding to the equilibrium partial pressures of hydrogen chloride for two different conversions of synthesis gas to hydrocarbons. It is noted that at the lower conversion, there is a decrease in the volume of the water condensate formed for an equal volume of inlet gas so that the concentration of acid in the condensate will be higher.

( Percent conversion =

$$\frac{\text{volumes of } (CO + H_2) \text{ reacted} \times 100}{\text{volumes of feed gas}} )$$

Thus, the aqueous condensate from the converter at 360° C. and 40% conversion would be strongly corrosive (0.16 mole of HCl per liter) but the aqueous condensate from the stripper at 200° C. would be only slightly corrosive (0.0013 mole of HCl per liter).

The above considerations also apply to the other hydrogen halides, hydrogen bromide and hydrogen iodide, and similar relationships can be derived by the application of Equations 2 and 3, above. In fact, for a given stripper temperature, the partial pressure of hydrogen bromide or iodide in equilibrium with the corresponding ferrous halide, will be lower than the partial pressure of hydrogen chloride in equilibrium with ferrous chloride. Also, for each hydrogen halide, the stripper temperature required for effective removal of the hydrogen halide from the gases would be above the dew point of water in the exit gases at the normal conversions obtained in the synthesis operation. This insures that the operation of the stripper will not be complicated by the condensation of water at that point. In addition, at effective stripper temperatures of 200° to 250° C., for example, the partial pressure of the hydrocarbons synthesized by catalysts inhibited by halogens is such that condensation of even the heavier fractions is not likely.

There are several methods as described below by which the above described principle can be applied, not only to reduce the hydrogen halide content of the exit gases, but also to effect a recycle of the recovered halide.

METHOD A—CATALYST RECYCLE

According to this method, both the converter and the stripper contain an iron catalyst which is maintained as a fluidized bed, the catalyst in the stripper being at an appreciably lower temperature. The exit gases from the converter pass through the stripper where hydrogen halide is removed from the gases as ferrous halide on the catalyst. Catalyst from the stripper is continuously circulated to the converter, where at the higher temperature, it loses part of its halide content as hydrogen halide in the gases. Correspondingly, catalyst from the converter is continuously circulated to the stripper where at the lower temperature it picks up hydrogen halide from the exit gases to complete the cycle. Make-up inhibitor is added to replace losses such as that of the hydrogen halide in the outlet gases from the stripper.

METHOD B—REGENERATIVE CATALYST

In the practice of this method, both the converter and the stripper contain about an equal volume of iron catalyst and alternate in function. That is, exit gases from the converter pass through the stripper at a lower temperature until a considerable deposit of iron halide is built up in the stripper. Then the gas flow is reversed and the temperature of the stripper raised to reaction temperatures so that synthesis gas reacts in the stripper to form hydrocarbons. Correspondingly, the temperature of the converter is reduced so that it acts to remove hydrogen halide from the exit gases until a deposit of iron halide has accumulated and the cycle is repeated.

METHOD C—STRIPPER RECYCLE

This method is similar to Method A except that the catalyst is not recirculated to and from the converter. Instead iron containing a deposit of iron halide is continuously removed from the stripper and passed to a regenerator at a higher temperature than the stripper. In the regenerator hydrogen is passed through a fluidized bed of the iron and iron halide forming hydrogen halide and reduced iron. The reduced iron is transported as a fluidized solid back to the stripper and the hydrogen containing the hydrogen halide inhibitor passes to the converted as part of the synthesis gas.

This method has the advantages that the iron bed used in the stripper need not be of the quality required for a hydrocarbon synthesis catalyst, and that the catalyst in the converter is not subjected to any change in temperature.

METHOD D—REGENERATIVE STRIPPER

The converter is operated with two strippers in parallel; one being on stream to remove hydrogen halide from the exit gases from the converter and the other being on a blow cycle with hydrogen at a higher temperature to remove hydrogen halide and regenerate the iron for stripping. The hydrogen and hydrogen halide from the blow cycle pass to the converter as part of the synthesis gas.

This method has the advantage that no solids are transported in the process.

The principle of this invention has been thoroughly established in practice, and the amount of hydrogen halide in the exit gases reduced by the operation of the stripper to a value close to the equilibrium value for the stripper temperature. It is, of course, unnecessary for the practical success of the invention with the equilibrium concentration of hydrogen halide at the lower temperature of the stripper be reached, since there is such a wide spread between the equilibrium concentrations at the converter temperatures and at the stripper temperatures.

Example 1

The apparatus consisted of two one-inch I. D. steel vessels arranged so that each vessel could operate independently to make hydrocarbons from synthesis gas or so that product gas from the first vessel could be passed through the second when desired. The first vessel, termed the reactor, was charged with 150 ml. of a fluidized iron catalyst prepared from reduced magnetic ore concentrate, and the second vessel, termed the stripper, was charged with 50 ml. of the same catalyst.

Synthesis gas (2.25 $H_2$:1CO), was passed through both vessels at 295° C., and a space velocity of 3100. Inhibition of the catalyst in each vessel was accomplished by feeding 0.13 ml./hr. (liquid) of ethylene dichloride with the synthesis gas. When the catalyst in each vessel had reached the same stage of activity and inhibition, the flow of fresh synthesis gas through the stripper was discontinued and its temperature lowered to 200° C. Product gas from the reactor was then passed directly into the stripper and from there through a condenser and the condensate collected. The water layer of the condensate was analyzed for hydrochloric acid. To measure the effectiveness of the stripper, it was taken out of service periodically and the water layer in the condensate from the reactor analyzed for hydrochloric acid. In every instance, the amount of carbon dioxide and the amount of $C_2$–$C_4$ olefins formed were measured. The results of the experiments were as follows:

| Catalyst Age, Hours | Reactor Temp., °C. | Stripper Service | Chloride as Ml. per Hour of Ethylene Dichloride | | HCl in Condensate Water, Moles per Liter |
|---|---|---|---|---|---|
| | | | Found in Exit Gas | Calc. from Equilibrium | |
| 108 | 312 | Out | 0.100 | 0.096 | 0.061 |
| 109 | 313 | In | 0.056 | 0.004 | 0.047 |
| 111 | 310 | In | 0.015 | 0.004 | 0.011 |
| 112 | 312 | In | 0.010 | 0.004 | 0.007 |
| 115 | 309 | Out | 0.085 | 0.100 | 0.077 |
| 117 | 308 | In | 0.009 | 0.004 | 0.009 |
| 121 | 315 | In | 0.009 | 0.004 | 0.007 |
| 134 | 355 | Out | 0.319 | 0.255 | 0.11 |
| 135 | 351 | In | 0.029 | 0.004 | 0.012 |
| 137 | 351 | In | 0.009 | 0.004 | 0.0033 |
| 138 | 352 | In | 0.009 | 0.004 | 0.0033 |

At the lower temperature of operation (308–315° C.) the conversion of synthesis gas to hydrocarbons was in the range 19 to 26%; the content of the $C_2$–$C_4$ olefins in the total hydrocarbon product was in the range 39 to 47%; and the molar ratio of $CO_2/(CO_2+H_2O)\times 100$ was in the range 3.6 to 6.1%. At the higher temperature of operation (351 to 355° C.), the conversion was in the range 36 to 41%, the olefins were in the range 37 to 43%, and $CO_2/(CO_2+H_2O)\times 100$ was in the range 2.0 to 4.2%. These results show that the effects of inhibition in reducing the carbon dioxide formation and in increasing the gaseous olefin content of the hydrocarbons were maintained regardless of whether the stripper was in or out of service.

The values for the acid content of the condensate water in the above table are the analytical results, and from this and the amount of water formed per hour, the chloride in the exit gas was calculated for comparison with the inlet feed as milliliters (liquid) of ethylene dichloride per hour. The equilibrium values for the chloride content on the same basis were calculated from the reactor temperatures or the stripper temperature of 200° C., respectively, depending on whether the stripper was in or out of service.

At catalyst age 108 hours, with the stripper out, the chloride in the exit gas was approximately the equilibrium value. With the stripper in at catalyst age 109–112 hours, the chloride content of the exit gas from the stripper fell to a level slightly above the equilibrium value for the stripper temperature. At catalyst age 115 hours, with the stripper out, the chloride content increased but, on putting the stripper in service at catalyst age 117 to 121 hours, the chloride content of the exit gas again declined.

On raising the reaction temperature to 355° C. at catalyst age 134 hours, with the stripper out, the chloride in the exit gas increased because of the effect of temperature on the hydrogen chloride- ferrous chloride equilibrium. However, with the stripper in service, the chloride content was reduced to the same value as before, even though the chloride content of the gas to the stripper was higher.

At the higher conversions attending the higher reaction temperatures, the acid concentrations in the condensate water were lower because more water is formed in the reaction, while the amount of chloride in the exit gas from the stripper remains constant at a fixed gas flow and stripper temperature. Thus, the operation of the stripper served to reduce the concentration of the acid in the condensate water in this case from 0.1 normal to 0.0033 normal.

*Example 2*

Another experiment was carried out in the apparatus and by the process described in Example 1. The results were as follows:

| Catalyst Age, Hours | Reactor Temp., ° C. | Stripper at 200° C. | Chloride as Ml. per Hour of Ethylene Dichloride | | Moles HCl per Liter of Product Water |
|---|---|---|---|---|---|
| | | | Found in Exit Gas | Calc. from Equilibrium | |
| 56 | 330 | Out | 0.135 | 0.175 | 0.0703 |
| 58 | 324 | In | 0.0147 | 0.0034 | 0.00805 |
| 61 | 322 | In | 0.0062 | 0.0034 | 0.00354 |
| 62 | 325 | In | 0.0046 | 0.0034 | 0.00257 |

The conversions were 27 to 30% and the amount of $C_2$–$C_4$ olefins in the total hydrocarbon product was 38 to 44%.

In this instance, the amount of chloride in the exit gas was reduced to a value approaching the equilibrium amount for a stripper temperature of 200° C.

What is claimed is:

1. In the synthesis of hydrocarbons by the reaction of carbon monoxide and hydrogen at synthesis conditions of temperature and pressure in the presence of an iron catalyst wherein the catalyst is inhibited during synthesis by maintaining therein an iron halide of the group consisting of chloride, bromide and iodide and wherein a product gas containing olefines, water and a hydrogen halide of said group is formed throughout the synthesis reaction; the improvement which comprises separating the hydrogen halide from the water by passing said product gas through a stripper bed of iron-containing particles at a temperature substantially below said synthesis temperature but above the dew point of said product gas, removing most of the hydrogen halide from the product gas by converting it to an iron halide in said bed, and reusing the iron halide formed in said bed as a source of halide for inhibition of the synthesis catalyst.

2. In the synthesis of hydrocarbons by the reaction of carbon monoxide and hydrogen at synthesis conditions of temperature and pressure in the presence of an iron catalyst wherein the catalyst is inhibited during synthesis by maintaining therein an iron halide of the group consisting of chloride, bromide and iodide and wherein a product gas containing olefines, water and a hydrogen halide of said group is formed throughout the synthesis reaction; the improvement which comprises separating the hydrogen halide from the water by passing said product gas through a stripper bed of iron-containing particles at a temperature substantially below said synthesis temperature but above the dew point of said product gas, removing most of the hydrogen halide from the product gas by converting it to an iron halide in said bed, and recycling the iron halide formed in said bed for inhibition of the synthesis catalyst.

3. In the synthesis of hydrocarbons by the reaction of carbon monoxide and hydrogen at synthesis conditions of temperature and pressure in the presence of an iron catalyst wherein the catalyst is inhibited during synthesis by maintaining therein an iron halide of the group consisting of chloride, bromide and iodide and wherein a product gas containing olefins, water and a hydrogen halide of said group is formed throughout the synthesis reaction; the improvement which comprises separating the hydrogen halide from the water by passing said product gas through a stripper bed of iron-containing particles at a temperature substantially below said synthesis temperature but above the dew point of said product gas, removing most of the hydrogen halide from the product gas by converting it to an iron halide in said bed, passing hydrogen over the mixture of iron and iron halide thus obtained in said bed to regenerate the iron and to form a gas composed of hydrogen and hydrogen halide, and passing said gas over the synthesis catalyst as part of the synthesis gas.

References Cited in the file of this patent

UNITED STATES PATENTS

| | | |
|---|---|---|
| 1,915,618 | Ralston et al. | June 27, 1933 |
| 2,194,186 | Pier et al. | Mar. 19, 1940 |
| 2,245,157 | Pier et al. | June 10, 1941 |
| 2,479,496 | Keith | Aug. 16, 1949 |
| 2,542,464 | Black et al. | Feb. 20, 1951 |
| 2,707,713 | Mattox | May 3, 1955 |
| 2,723,912 | Reeve | Nov. 15, 1955 |

FOREIGN PATENTS

| | | |
|---|---|---|
| 449,274 | Great Britain | June 24, 1936 |

OTHER REFERENCES

Jacobson: Encyclopedia of Chemical Reactions, Reinhold Publishing Company, vol. IV, pages 6–7 (1951).